(12) United States Patent
Cudak et al.

(10) Patent No.: US 9,300,128 B2
(45) Date of Patent: Mar. 29, 2016

(54) METHOD TO PROVIDE A MORE ROBUST GFCI CIRCUIT BREAKER

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 14/083,727

(22) Filed: Nov. 19, 2013

(65) Prior Publication Data

US 2015/0138677 A1    May 21, 2015

(51) Int. Cl.
*H02H 9/08* (2006.01)
*H02H 3/16* (2006.01)

(52) U.S. Cl.
CPC ........................................ *H02H 3/16* (2013.01)

(58) Field of Classification Search
USPC .......................................................... 361/42
See application file for complete search history.

(56) References Cited

U.S. PATENT DOCUMENTS

| | | | |
|---|---|---|---|
| 4,466,040 A * | 8/1984 | Barthel ................. | H02H 11/00 307/130 |
| 5,151,841 A * | 9/1992 | Knights ................ | H02H 11/00 361/86 |
| 5,708,551 A * | 1/1998 | Bosatelli ............. | H01R 13/641 307/38 |
| 6,546,342 B1 | 4/2003 | Dougherty et al. | |
| 6,552,888 B2 * | 4/2003 | Weinberger .......... | H01R 13/713 307/125 |
| 6,988,375 B2 * | 1/2006 | Bashark ............... | G01R 15/142 34/553 |
| 7,336,457 B2 | 2/2008 | Liscinsky, III | |
| 7,400,476 B1 * | 7/2008 | Hull, Jr. ............... | H02H 11/002 361/42 |
| 7,672,097 B1 | 3/2010 | Striblen et al. | |
| 7,692,904 B2 | 4/2010 | Li et al. | |
| 7,791,850 B2 | 9/2010 | Chen | |
| 7,944,331 B2 | 5/2011 | Porter et al. | |
| 7,978,447 B2 * | 7/2011 | Baxter ................. | H02H 11/005 361/42 |
| 8,300,369 B2 | 10/2012 | Hamer | |
| 2004/0075963 A1 | 4/2004 | Liu et al. | |
| 2009/0206059 A1 * | 8/2009 | Kiko ..................... | H01H 47/22 218/143 |
| 2012/0300348 A1 * | 11/2012 | Franks .................... | H02H 3/10 361/42 |
| 2015/0138677 A1 * | 5/2015 | Cudak ..................... | H02H 3/16 361/42 |

* cited by examiner

*Primary Examiner* — Ronald W Leja

(74) *Attorney, Agent, or Firm* — Jeffrey L. Streets

(57) ABSTRACT

A system and method include a ground fault circuit interrupter (GFCI) supplying electricity to an appliance. The GFCI supplies direct current (DC) to an appliance upon connection to the GFCI, and the appliance automatically communicates data to the GFCI prior to startup of the appliance in response to receiving the DC, wherein the data describes maximum out of phase conditions expected during appliance startup, and the GFCI acknowledges receipt of the data. The appliance sends a status message to the GFCI indicating the appliance is ready for alternating current (AC) in response to the startup of the appliance, and the GFCI switches from supplying the low voltage direct current to supplying AC to the appliance in response to the GFCI receiving the status message. The method further comprises preventing the GFCI from tripping in response to out of phase conditions less than the maximum out of phase conditions.

18 Claims, 2 Drawing Sheets

METHOD TO PROVIDE A MORE ROBUST GFCI CIRCUIT BREAKER

BACKGROUND

1. Field of the Invention

The present invention relates to ground fault circuit interrupters.

2. Background of the Related Art

A ground fault circuit interrupter (GFCI) is useful in a variety of scenarios to protect consumers from risk of electrical shock in damp or wet areas where a small amount of current can be deadly due to strong grounding conditions. GFCIs are used primarily for small appliances as well as in bathroom and kitchen areas where appliances are most likely to come into contact with water. GFCIs have not been put in wide use outside these applications because the use of a GFCI is problematic in applications where voltages may be out of phase due to capacitance and inductance of the appliance.

BRIEF SUMMARY

One embodiment of the present invention provides a system comprising a ground fault circuit interrupter and an appliance, wherein the appliance includes a connector for selectively coupling to a receptacle of the ground fault circuit interrupter, and wherein the connector couples two conductors from the appliance to two conductors in the receptacle. The ground fault circuit interrupter supplies electrical power from an electrical power source to a receptacle, wherein the ground fault circuit interrupter includes a first multiplexer coupled to the receptacle, a first inter-integrated circuit device, and the electrical power source for selectively connecting the receptacle to the first inter-integrated circuit device or connecting the receptacle to the electrical power source. The ground fault circuit interrupter provides direct current to the receptacle when the first inter-integrated circuit device is connected to the receptacle and provides alternating current to the receptacle when the electrical power source is connected to the receptacle. The appliance includes a second inter-integrated circuit device, a load, and a second multiplexer coupled to the connector, the second inter-integrated circuit device, and the load for selectively connecting the connector to the second inter-integrated circuit device or connecting the connector to the load.

Another embodiment of the present invention provides a method, comprising a ground fault circuit interrupter supplying low voltage direct current to an appliance in response to electrically connecting the appliance to the ground fault circuit interrupter. The appliance automatically communicates data to the ground fault circuit interrupter prior to startup of the appliance in response to receiving the low voltage direct current, wherein the data describes maximum out of phase conditions that may be caused by the appliance during the startup of the appliance, and the ground fault circuit interrupter sends an acknowledgement to the appliance in response to receiving the data. The appliance sends a status message to the ground fault circuit interrupter indicating that the appliance is ready for alternating current in response to the startup of the appliance, and the ground fault circuit interrupter switches from supplying the low voltage direct current to supplying alternating current to the appliance in response to the ground fault circuit interrupter receiving the status message. The method further comprises preventing the ground fault circuit interrupter from tripping in response to out of phase conditions caused by the startup of the appliance that are less than the maximum out of phase conditions.

DETAILED DESCRIPTION

Figure 1:
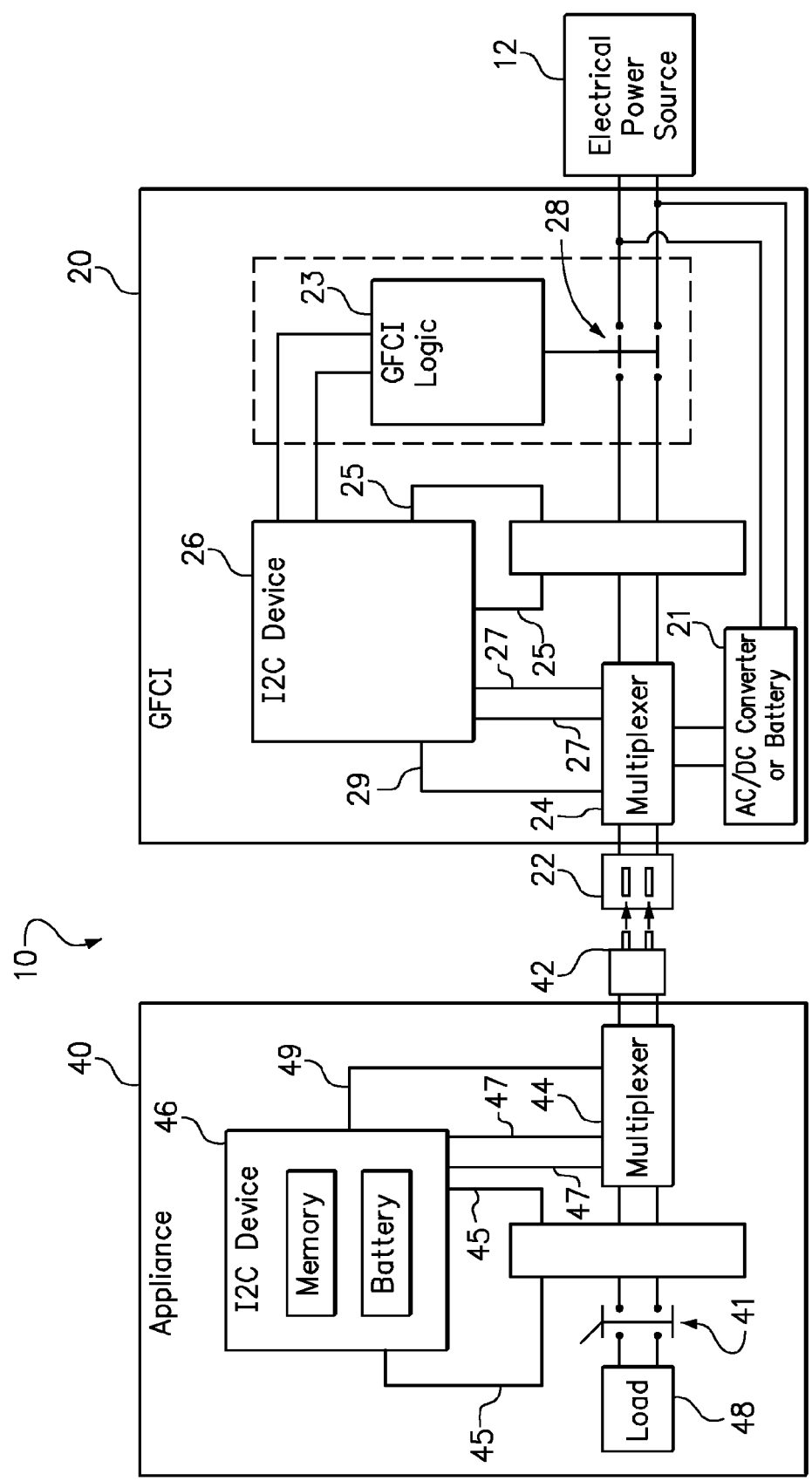
FIG. 1 is a diagram of a ground fault circuit interrupter (GFCI) providing electrical power from an electrical power source to an appliance.

One embodiment of the present invention provides a system comprising a ground fault circuit interrupter and an appliance, wherein the appliance includes a connector for selectively coupling to a receptacle of the ground fault circuit interrupter, and wherein the connector couples two conductors from the appliance to two conductors in the receptacle. The ground fault circuit interrupter supplies electrical power from an electrical power source to a receptacle, wherein the ground fault circuit interrupter includes a first multiplexer coupled to the receptacle, a first inter-integrated circuit device, and the electrical power source for selectively connecting the receptacle to the first inter-integrated circuit device or connecting the receptacle to the electrical power source. The ground fault circuit interrupter provides direct current to the receptacle when the first inter-integrated circuit device is connected to the receptacle and provides alternating current to the receptacle when the electrical power source is connected to the receptacle. The appliance includes a second inter-integrated circuit device, a load, and a second multiplexer coupled to the connector, the second inter-integrated circuit device, and the load for selectively connecting the connector to the second inter-integrated circuit device or connecting the connector to the load.

The appliance may be any electronic device having a load that exhibits sufficient capacitance and inductance to cause an out of phase condition that might trip a typical ground fault circuit interrupter. The appliance may be a component of a computer system, such as a server. In particular, the appliance may be a water-cooled server.

The first and second inter-integrated circuit (I2C) devices are capable of communicating over a two wire connection, such as the two wires within a power cord extending from the appliance for coupling to the receptacle of the ground fault circuit interrupter (GFCI). The first and second I2C devices may both be capable of transmitting and receiving messages, but various embodiments of the invention may still be implemented as long the first I2C device of the GFCI is capable of receiving messages and the second I2C device of the appliance is capable of transmitting messages. The second I2C device preferably includes non-volatile memory storing the out-of-phase data for the load within the appliance, such that the data is available for transmitting to a GFCI. Preferably, the second I2C device of the appliance will communicate data to a first I2C device of the ground fault circuit interrupter. Optionally, the first and second I2C devices may use a limited command set of an I2C interface.

The appliance may also include a switch for turning the appliance on (startup) and off (shutdown). The switch may be a double pole on/off switch that controls power to both the second inter-integrated circuit device and the load within the appliance. Such an appliance may also include a battery that provides DC voltage to the second inter-integrated circuit device when the ground fault circuit interrupter is not supplying low voltage DC power to the appliance. As a result, the appliance may be turned off, yet the second inter-integrated circuit device has power from the battery so that the second I2C device can still control a multiplexer.

Another embodiment of the present invention provides a method, comprising a ground fault circuit interrupter supplying low voltage direct current to an appliance in response to electrically connecting the appliance to the ground fault circuit interrupter. The appliance automatically communicates data to the ground fault circuit interrupter prior to startup of the appliance in response to receiving the low voltage direct current, wherein the data describes maximum out of phase conditions that may be caused by the appliance during the startup of the appliance, and the ground fault circuit interrupter sends an acknowledgement to the appliance in response to receiving the data. The appliance sends a status message to the ground fault circuit interrupter indicating that the appliance is ready for alternating current in response to the startup of the appliance, and the ground fault circuit interrupter switches from supplying the low voltage direct current to supplying alternating current to the appliance in response to the ground fault circuit interrupter receiving the status message. The method further comprises preventing the ground fault circuit interrupter from tripping in response to out of phase conditions caused by the startup of the appliance that are less than the maximum out of phase conditions.

The method may further comprise starting a timer at the same time that the ground fault circuit interrupter begins supplying alternating current to the appliance, wherein the step of preventing the ground fault circuit interrupter from tripping includes preventing the ground fault circuit interrupter from tripping until the timer reaches a duration specified in the maximum out of phase conditions. Accordingly, the GFCI is made to ignore out of phase conditions caused by the appliance from the startup of the appliance until after a duration specified in the maximum out of phase conditions for the appliance. Optionally, the method may still further comprise, after the timer reaches the duration specified, allowing the ground fault circuit interrupter to trip in response to detecting a differential current between supply and return lines exceeding a differential current setpoint. Accordingly, the ground fault circuit interrupter may then trip if the differential current between the two conductors persists for longer than the duration specified in the maximum out of phase conditions for the appliance, or if the out of phase differential current is larger than the differential current value supplied by the appliance, or some combination of these two embodiments.

In a further embodiment of the method, the appliance may switch a multiplexer within the appliance to direct the alternating current from the ground fault circuit interrupter to a load within the appliance in response to the startup of the appliance. Separately, the ground fault circuit interrupter may switch a multiplexer within the ground fault circuit interrupter to direct the alternating current from an electrical power source to the appliance in response to the ground fault circuit interrupter receiving the status message.

In another embodiment, the maximum out of phase conditions are stored in non-volatile memory of the appliance, such as in EEPROM (electronically erasable programmable read only memory) or flash memory. The maximum out of phase conditions may be, for example, predetermined values, and may include a magnitude and a duration. Still further, the data describing maximum out of phase conditions may include an identification of the appliance type, where the method further includes the ground fault circuit interrupter accessing a lookup table to identify maximum out of phase conditions associated with the identified appliance type.

Another embodiment may, in response to turning off the appliance, include automatically switching the multiplexer in the appliance to disconnect a load with a collapsing field and connect the second I2C device to the wires connecting the appliance to the ground fault circuit interrupter. Optionally, the data communicated from the appliance to the GFCI may include maximum out of phase conditions that may be caused by the appliance during the shutdown of the appliance.

The invention provides a method and apparatus that allows a GFCI to be used with an appliance that creates out of phase conditions on the supply and return lines of the power supply. Each appliance has an internal I2C interface that stores and communicates data describing an amount of worst-case collapsing or expanding electrical fields (out of phase conditions), due to capacitance or inductance, that the appliance will produce at both startup and/or shutdown. The GFCI obtains this information from the I2C device on the appliance before the GFCI supplies AC voltage to the GFCI receptacle.

When the GFCI breaker subsequently supplies alternating current to the appliance, the appliance creates the expected out of phase condition at a level consistent with the data that the GFCI breaker obtained from the I2C device on the appliance. The GFCI breaker may have a built-in configurable delay that prevents tripping during the period of delay identified by the data obtained from the appliance.

In one embodiment, the wires that supply AC voltage from the GFCI breaker to the appliance may also be used to establish an I2C bus that allows communication between the GFCI breaker and the appliance. In one option, the I2C bus communications may occur simultaneously with the AC voltage. In a separate option, the I2C bus communications and the AC voltage may occur sequentially. Optionally, the I2C bus communications and the AC voltage may be separated by a multiplexor. For example, the I2C device may be multiplexed with the internal workings (i.e., the load) of the appliance that requires standard alternating current. When the appliance is plugged into the power supply receptacle of the GFCI breaker, the GFCI breaker may detect the communication coming from the appliance. Once the GFCI breaker has receiving data about the maximum out of phase conditions of the appliance, the GFCI may ignore out of phase conditions that do not exceed the maximum out of phase conditions that the appliance expected to create, and which the GFCI breaker may encounter, during the power up of the appliance. The GFCI breaker may then use this data to create either a delay needed to prevent collapsing or expanding fields from tripping the breaker, or a time based window of controlled differential between the wire pairs. For example, if the data indicates that the appliance may cause a maximum expected differential of 200 milliamps for 200 milliseconds, then the GFCI breaker may not trip in response to any differential up to 200 milliamps for 200 milliseconds.

In another embodiment, if the GFCI breaker has received no data from the appliance about an expected out of phase condition, then the GFCI breaker may perform as a normal GFCI breaker, perhaps having no delay in the tripping point. The ability of the GFCI breaker to default to performance as a normal GFCI breaker prevents risk of electrical damage in the event that an appliance is submerged or inundated with water. The user is protected by the fact that the GFCI breaker only implements a delay when the appliance has a functioning I2C interface. For example, if a 120 volt circuit of an appliance is grounded, then the I2C interface won't work and the GFCI breaker will not implement any delay. The GFCI breaker will only implement a delay in situations where the 120 volt lines are clear of ground before the power is ever applied.

In a further embodiment, a user may push a power switch on the appliance from an "off" position to an "on" position. During the few milliseconds that it takes for the switch to move from the "off" position to the "on" position, the appliance may send a status message to the GFCI breaker indicating that the appliance is ready for power. In response to the receiving the status message, the GFCI applies power to the appliance and starts a timer inside the GFCI breaker. When the timer reaches a preset amount of time that was designated in the data obtained from the appliance, then the GFCI breaker may start to monitor the differential current between the supply and return electrical power lines. In other words, the GFCI breaker will not trip until the amount of time on the timer reaches or exceeds the delay identified by the I2C device of the appliance.

Still further, there is a risk that turning the appliance off will cause a collapsing field that will trip the breaker. In an optional embodiment, as the power switch is moved from the "on" position to the "off" position, the multiplexer of the appliance is automatically switched so that the I2C device is reconnected and a motor or other load inside the appliance that may have a collapsing field is disconnected from the circuit so that the out of phase condition of the load can no longer affect the GFCI breaker.

If the I2C device of the appliance utilizes a battery, then a double pole switch may be used to inform the I2C device that it can shut down in response to the appliance being turned on. For example, the I2C device may remove power from itself in response to detecting a falling edge signal as the switch is turned on the appliance. Fast I2C now allows for falling edge signals to be recognized as such in 300 nanoseconds on circuits capable of 3.4 Mb/sec, which allows for simple on/off or device identify commands to occur quickly in the time it takes an appliance switch to be moved from the "on" to "off" position or from the "off" to "on" position. If, at the point of plugging an appliance into the receptacle of the GFCI breaker, no I2C slave device is discovered, the GFCI breaker simply applies power to the receptacle without implementing a delay that might prevent tripping the breaker due to the applicant experiencing a normal out of phase condition. An I2C slave device may not be discovered if either the appliance was not equipped with an I2C device or the appliance has an I2C device that is damaged or broken.

Although the foregoing discussion refers to an I2C interface, a custom limited command set of an I2C interface may be used since the I2C bus only has to contend with a single device and there are no concerns of conflicting devices on the interface. The reference herein to an I2C interface or device encompasses any standard or custom interface capable of running on a two wire path.

The intention is to have the GFCI breaker provide power on the I2C bus and when the appliance is attached that provides power to the I2C bus on the appliance itself. When the appliance gets a low voltage power source on the I2C bus, the bus simply starts transmitting its type or delay needs till the GFCI breaker responds with some acknowledgement then the multiplexer opens and lets alternating current flow into the appliance. The detection is simply when you plug it in, power is present and the appliance starts sending data on I2C link. The GFCI breaker sees the data start transmitting and that is how it knows a device is out there (i.e., the presence of traffic on the I2C bus).

The "I2C device" in the appliance has a small amount of non-volatile memory, such as an internally registered EEPROM or flash, for storing the out-of-phase data. The out-of-phase data may either include the maximum magnitude and/or duration values of any expected out-of-phase condition for the appliance, or identify the appliance type such that the GFCI breaker can determine an appropriate amount of delay time.

When the appliance is plugged into the receptacle of the GFCI breaker, the presence of power allows the I2C device of the appliance to start transmitting its data. The GFCI breaker detects the presence of data on the bus as an indication that the appliance has been connected and that the appliance has an I2C device.

In a preferred embodiment, the appliance may include a battery that allows the I2C device to control the operation of the multiplexor even when the GFCI is not supplying low power DC voltage to the appliance. For example, after the I2C device of the appliance has communicated with the GFCI breaker, the GFCI breaker stops providing low power DC voltage to the appliance and begins providing alternating current on the same line. When the appliance is turned off, an out of phase condition can occur in which a collapsing field may trip the GFCI breaker. If the appliance has a double pole on/off switch that breaks power to both the appliance motor and the I2C device, the I2C device can cause the multiplexer to open at the same time that the on/off switch is turned to the off position. Accordingly, the I2C device can cause the multiplexer to truncate the power connection to the GFCI before the motor or other device in the applicant can create a collapsing field that could trip the breaker.

FIG. 1 is a diagram of a system 10 including a ground fault circuit interrupter (GFCI) 20 providing electrical power from an electrical power source 12 to an appliance 40. The GFCI 20 provides electrical power from the electrical power source 12 to a receptacle 22. The GFCI 20 includes a first multiplexer 24 coupled to the receptacle 22, a first inter-integrated circuit (I2C) device 26, and the electrical power source 12 for selectively connecting the receptacle 22 to the first inter-integrated circuit device 26 or connecting the receptacle 22 to the electrical power source 12. The GFCI 20 provides direct current (DC) to the receptacle 22 when the first inter-integrated circuit device 26 is connected to the receptacle and provides alternating current (AC) to the receptacle 22 when the electrical power source 12 is connected to the receptacle. The DC current may be supplied by an AC/DC converter 21 coupled to the electrical power source 12 or by a replaceable battery.

The appliance 40 includes a connector 42 for selectively coupling to the receptacle 22, wherein the connector couples two conductors from the appliance (i.e., two prongs) to two conductors in the receptacle (i.e., two sockets). The appliance 40 also includes a second inter-integrated circuit device 46, a load 48, and a second multiplexer 44 coupled to the connector 42, the second inter-integrated circuit device 46, and the load 48 for selectively connecting the connector to the second inter-integrated circuit device or connecting the connector to the load. The appliance also preferably includes double pole switch 41 that disconnects both conductors leading to the load (i.e., a motor) such that a collapsing field can't trip the circuit breaker as a result of the appliance being turned "off".

The first I2C device 26 can receive electrical power from two lines 25, receives a digital communication from the appliance over two other lines 27, and sends a control signal to the multiplexer 24 over another line 29. Similarly, the second I2C device 46 can receive electrical power from two lines 45, transmits a digital communication to the GFCI 20 over two other lines 47, and sends a control signal to the multiplexer 44 over another line 49. The second I2C device 46 may include memory that stores the out-of-phase conditions for the appliance.

The GFCI 20 monitors differential current between the two conductors coupled to the receptacle 22 and trips a switch 28 if a differential current is detected on the assumption or possibility that the differential is due to current flowing thru a human being instead of returning back to the GFCI breaker itself. The switch 28 is controlled by GFCI logic device 23 which receives the out-of-phase conditions from the I2C device 26 such that the GFCI logic device 23 is able to allow a time delay, a specified level of current differential, or some combination before breaking the circuit (i.e., disconnecting the receptacle 22 from the electrical power source 12 using the switch 28).

In one alternative to obtaining out-of-phase conditions (differential current values and/or timer values) from the appliance, the GFCI logic 23 may store a list of supported appliances. Accordingly, at the point that an appliance 40 is plugged into the GFCI 20, the appliance communicates with the GFCI over the I2C devices as previously described in order to identify the appliance to the GFCI Logic 23. The GFCI logic 23 may then lookup the appliance identification in the stored list and read the differential current values and/or timer values associated with the identified appliance. It should be recognized that differential current values and/or timer values may be "associated" with the identified appliance by being stored in a common record or otherwise stored in a predetermined relationship with the appliance identification.

Figure 2:
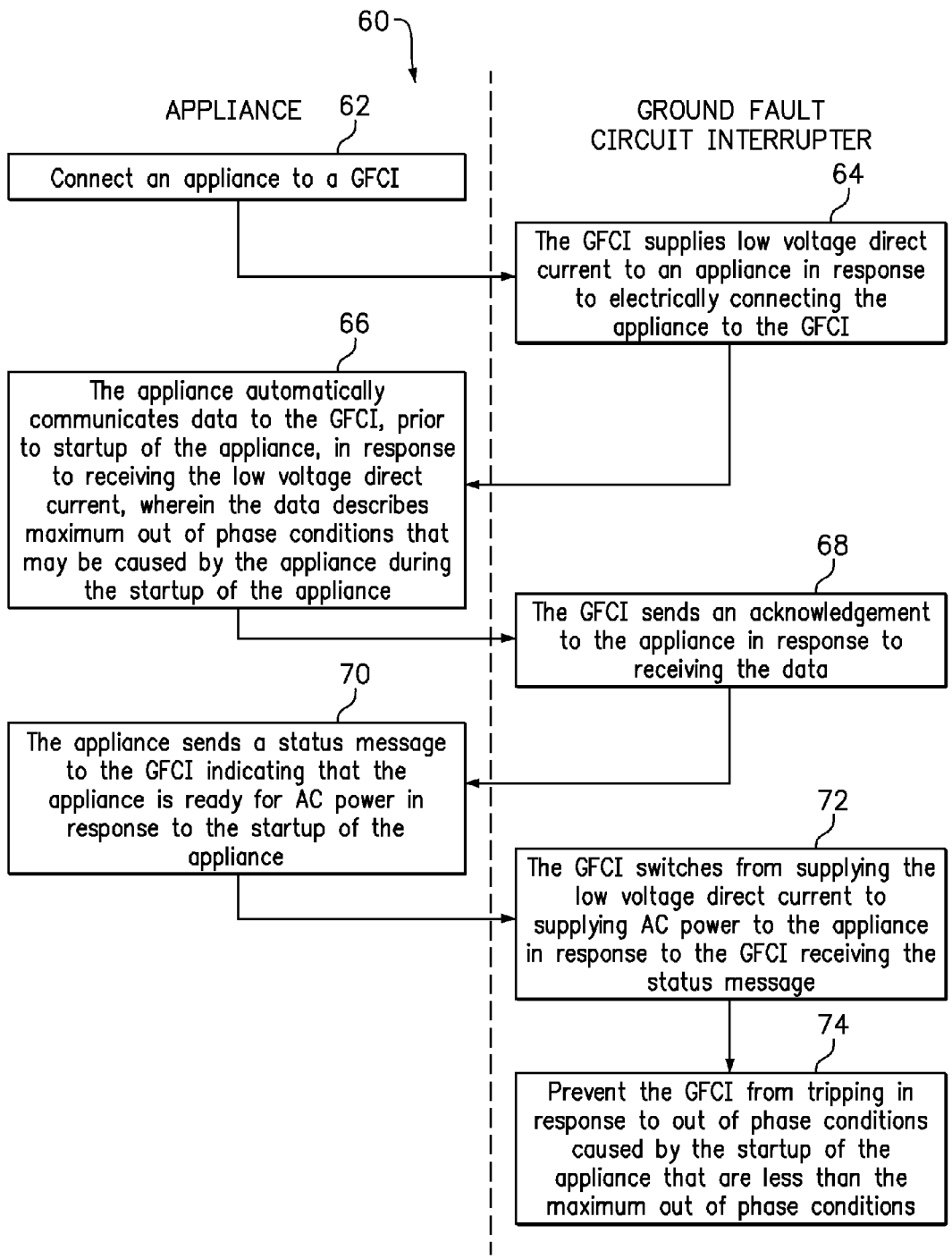
FIG. 2 is a flowchart of a method of operating the ground fault circuit interrupter and the appliance.

FIG. 2 is a flowchart of a method 60 of operating the ground fault circuit interrupter and the appliance. Steps initiated primarily by the appliance are shown on the left of the flowchart, and steps initiated primarily by the ground fault circuit interrupter (GFCI) are shown on the right of the flowchart. After an appliance has been connected to a GFIC in step 62, then the GFCI supplies low voltage direct current to an appliance in response to electrically connecting the appliance to the GFCI in step 64. In step 66, the appliance automatically communicates data to the GFCI, prior to startup of the appliance, in response to receiving the low voltage direct current, wherein the data describes maximum out of phase conditions that may be caused by the appliance during the startup of the appliance. In step 68, the GFCI sends an acknowledgement to the appliance in response to receiving the data. Then, in step 70, the appliance sends a status message to the GFCI indicating that the appliance is ready for alternating current in response to the startup of the appliance. In step 72, the GFCI switches from supplying the low voltage direct current to supplying alternating current to the appliance in response to the GFCI receiving the status message. The method then, in step 74, the GFCI is prevented from tripping in response to out of phase conditions caused by the startup of the appliance that are less than the maximum out of phase conditions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    a ground fault circuit interrupter supplying electrical power from an electrical power source to a receptacle, wherein the ground fault circuit interrupter includes a first multiplexer coupled to the receptacle, a first inter-integrated circuit device, and the electrical power source for selectively connecting the receptacle to the first inter-integrated circuit device or connecting the receptacle to the electrical power source, and wherein the ground fault circuit interrupter provides direct current to the receptacle when the first inter-integrated circuit device is connected to the receptacle and provides alternating current to the receptacle when the electrical power source is connected to the receptacle; and
    an appliance including a connector for selectively coupling to the receptacle, wherein the appliance includes a second inter-integrated circuit device, a load, and a second multiplexer coupled to the connector, the second inter-integrated circuit device, and the load for selectively connecting the connector to the second inter-integrated circuit device or connecting the connector to the load, wherein the connector couples two conductors from the appliance to two conductors in the receptacle.

2. The system of claim 1, wherein the second inter-integrated circuit device includes non-volatile memory storing out-of-phase data for the load within the appliance.

3. The system of claim 1, wherein the appliance further includes a double pole on/off switch that controls power to both the second inter-integrated circuit device and the load.

4. The system of claim 1, wherein the appliance includes a battery that provides direct current to the second inter-integrated circuit device when the ground fault circuit interrupter is not supplying direct current to the appliance.

5. A method, comprising:
    a ground fault circuit interrupter supplying low voltage direct current to an appliance in response to electrically connecting the appliance to the ground fault circuit interrupter;
    the appliance automatically communicating data to the ground fault circuit interrupter prior to startup of the appliance in response to receiving the low voltage direct current, wherein the data describes maximum out of phase conditions that may be caused by the appliance during the startup of the appliance;
    the ground fault circuit interrupter sending an acknowledgement to the appliance in response to receiving the data;
    the appliance sending a status message to the ground fault circuit interrupter indicating that the appliance is ready for alternating current in response to the startup of the appliance;
    the ground fault circuit interrupter switching from supplying the low voltage direct current to supplying alternating current to the appliance in response to the ground fault circuit interrupter receiving the status message; and
    preventing the ground fault circuit interrupter from tripping in response to out of phase conditions caused by the startup of the appliance that are less than the maximum out of phase conditions.

6. The method of claim 5, further comprising:
    starting a timer at the same time that the ground fault circuit interrupter begins supplying alternating current to the appliance, wherein the step of preventing the ground fault circuit interrupter from tripping includes preventing the ground fault circuit interrupter from tripping until the timer reaches a duration specified in the maximum out of phase conditions.

7. The method of claim 6, further comprising:
after the timer reaches the duration specified, allowing the ground fault circuit interrupter to trip in response to detecting a differential current between supply and return lines exceeding a differential current setpoint.

8. The method of claim 5, further comprising:
the appliance switching a multiplexer within the appliance to direct the alternating current from the ground fault circuit interrupter to a load within the appliance in response to the startup of the appliance.

9. The method of claim 8, further comprising:
the ground fault circuit interrupter switching a multiplexer within the ground fault circuit interrupter to direct the alternating current from an electrical power source to the appliance in response to the ground fault circuit interrupter receiving the status message.

10. The method of claim 5, further comprising:
storing the maximum out of phase conditions in non-volatile memory of the appliance.

11. The method of claim 10, wherein the maximum out of phase conditions are predetermined values.

12. The method of claim 11, wherein the maximum out of phase conditions include a magnitude and a duration.

13. The method of claim 5, wherein the data describing maximum out of phase conditions includes an identification of the appliance type, the method further comprising:
the ground fault circuit interrupter accessing a lookup table to identify maximum out of phase conditions associated with the identified appliance type.

14. The method of claim 5, wherein the data is communicated to a first I2C device of the ground fault circuit interrupter from a second I2C device of the appliance.

15. The method of claim 14, wherein the first and second I2C devices use a limited command set of an I2C interface.

16. The method of claim 5, wherein the data and the AC voltage are carried over the same wires connecting the appliance to the ground fault circuit interrupter.

17. The method of claim 16, further comprising:
in response to turning off the appliance, automatically switching a multiplexer in the appliance to disconnect a load with a collapsing field and connect second I2C device to the wires connecting the appliance to the ground fault circuit interrupter.

18. The method of claim 5, wherein the data further describes maximum out of phase conditions that may be caused by the appliance during the shutdown of the appliance.

\* \* \* \* \*